(12) United States Patent
Himoto et al.

(10) Patent No.: US 8,899,017 B2
(45) Date of Patent: Dec. 2, 2014

(54) EXHAUST TREATMENT UNIT

(71) Applicant: Komatsu Ltd., Tokyo (JP)

(72) Inventors: Manabu Himoto, Kyotanabe (JP);
Osamu Nishimura, Joyo (JP); Tadashi Mori, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/343,524

(22) PCT Filed: Nov. 19, 2012

(86) PCT No.: PCT/JP2012/079922
§ 371 (c)(1),
(2), (4) Date: Mar. 7, 2014

(87) PCT Pub. No.: WO2014/061164
PCT Pub. Date: Apr. 24, 2014

(65) Prior Publication Data
US 2014/0250870 A1    Sep. 11, 2014

(30) Foreign Application Priority Data
Oct. 16, 2012   (JP) ................................. 2012-228778

(51) Int. Cl.
*F01N 3/00* (2006.01)
*F01N 3/20* (2006.01)
(52) U.S. Cl.
CPC .................................... *F01N 3/2066* (2013.01)
USPC ................................ 60/282; 60/322; 60/324
(58) Field of Classification Search
None
See application file for complete search history.

(56) References Cited

U.S. PATENT DOCUMENTS

| | | | | |
|---|---|---|---|---|
| 4,011,849 A * | 3/1977 | Latham | ..................... | 123/198 E |
| 4,133,547 A * | 1/1979 | Fox | ................. | 180/68.3 |
| 4,349,078 A * | 9/1982 | Shimada et al. | ............. | 180/69.1 |
| 5,211,013 A * | 5/1993 | Bonde et al. | .................... | 60/323 |
| 6,655,486 B2 * | 12/2003 | Oshikawa et al. | ............ | 180/68.1 |
| 6,990,804 B2 * | 1/2006 | Jacob et al. | ..................... | 60/299 |
| 7,866,143 B2 * | 1/2011 | Buhmann et al. | ............... | 60/286 |
| 2007/0137188 A1 * | 6/2007 | Ohya et al. | ........................ | 60/311 |
| 2008/0121451 A1 * | 5/2008 | Kertz et al. | ................ | 180/69.24 |
| 2010/0095660 A1 * | 4/2010 | Oliver et al. | .................... | 60/324 |

(Continued)

FOREIGN PATENT DOCUMENTS

| | | |
|---|---|---|
| JP | 2008-156835 A | 7/2008 |
| JP | 2009-103016 A | 5/2009 |

(Continued)

OTHER PUBLICATIONS

International Search Report for the corresponding international application No. PCT/JP2012/079922, issued on Nov. 19, 2012.
Office Action for the corresponding Japanese application No. 2012-228778, issued on Dec. 3, 2013.

Primary Examiner — Jesse Bogue
(74) Attorney, Agent, or Firm — Global IP Counselors, LLP

(57) ABSTRACT

An exhaust treatment unit treats exhaust gas from an engine of a work vehicle. The exhaust treatment unit includes a diesel particulate filter device, a selective catalytic reduction device, a first support component and a second support component. The diesel particulate filter device treats the exhaust gas. The selective catalytic reduction device treats the exhaust gas. The first support component supports the diesel particulate filter device. The second support component supports the selective catalytic reduction device and the first support component. The first support component is detachable from the second support component.

16 Claims, 11 Drawing Sheets

(56) References Cited

U.S. PATENT DOCUMENTS

2010/0186381 A1* 7/2010 Charles et al. .................. 60/282
2010/0187383 A1* 7/2010 Olsen et al. ................... 248/201
2010/0218488 A1* 9/2010 Yokota ............................ 60/297
2012/0260635 A1* 10/2012 Aneja et al. ..................... 60/274

FOREIGN PATENT DOCUMENTS

| | | |
|---|---|---|
| JP | 2012-2016 A | 1/2012 |
| JP | 2012-97413 A | 5/2012 |
| JP | 2012-136845 A | 7/2012 |
| WO | 2011152306 A1 | 12/2011 |

* cited by examiner

EXHAUST TREATMENT UNIT

CROSS-REFERENCE TO RELATED APPLICATIONS

This application is a U.S. National stage application of International Application No. PCT/JP2012/079922, filed on Nov. 19, 2012. This U.S. National stage application claims priority under 35 U.S.C. §119(a) to Japanese Patent Application No. 2012-228778, filed in Japan on Oct. 16, 2012, the entire contents of which are hereby incorporated herein by reference.

BACKGROUND

1. Field of the Invention

The present invention relates to an exhaust treatment unit for treating exhaust gas from an engine of a work vehicle.

2. Background Information

Work vehicles such as a hydraulic excavator are equipped with an exhaust treatment device. The exhaust treatment device is connected to an engine through a connection pipe in order to process the exhaust gas from the engine. The exhaust treatment device includes a diesel particulate filter device and a selective catalytic reduction device. The diesel particulate filter device reduces particulates contained in the exhaust gas. The selective catalytic reduction device reduces nitrogen oxide ($NO_x$) contained in the exhaust gas. In some cases, these two exhaust treatment devices are installed in a work vehicle as a single unit for implementing easiness of maintenance. Such unit is referred to as an exhaust treatment unit.

For example, Patent Literature 1 describes an aspect that the exhaust treatment unit is attached to a support component other than the engine. Specifically, in Japan Laid-open Patent Application Publication No. JP-2012-097413(A), a table is mounted on an upper frame through support legs. The diesel particulate filter device and the selective catalytic reduction device are disposed on the top surface of the table.

SUMMARY

In the maintenance of the diesel particulate filter device, the diesel particulate filter device is designed to be detached from the vehicle. Further, the frequency of maintenance for the diesel particulate filter device is greater than that of the selective catalytic reduction device because the diesel particulate filter device traps particulates contained in the exhaust gas. Therefore, it is desirable to dispose the diesel particulate filter device within the exhaust treatment unit so that the diesel particulate filter device can be easily detached from the vehicle.

It is an object of the present invention to provide an exhaust treatment unit whereby the maintenance performance of a diesel particulate filter device can be enhanced.

An exhaust treatment unit according to a first aspect of the present invention is an exhaust treatment unit for treating exhaust gas from an engine of a work vehicle, and includes a diesel particulate filter device, a selective catalytic reduction device, a first support component and a second support component. The diesel particulate filter device and the selective catalytic reduction device treat the exhaust gas. The first support component supports the diesel particulate filter device. The second support component supports the selective catalytic reduction device and the first support component. The first support component is attachable/detachable to/from the second support component.

An exhaust treatment unit according to a second aspect of the present invention relates to the exhaust treatment unit according to the first aspect, wherein the selective catalytic reduction device is supported by the second support component while being disposed lower than the diesel particulate filter device.

An exhaust treatment unit according to a third aspect of the present invention relates to the exhaust treatment unit according to the first or second aspect, wherein the diesel particulate filter device has a connection port. The connection port is connected to a connection pipe for connecting the engine and the diesel particulate filter device. The second support component has an insertion hole through which the connection port is inserted.

An exhaust treatment unit according to a fourth aspect of the present invention relates to the exhaust treatment unit according to the third aspect, wherein the connection port is downwardly directed from the diesel particulate filter device.

An exhaust treatment unit according to a fifth aspect of the present invention relates to the exhaust treatment unit according to the third or fourth aspect, wherein the connection port is disposed upwards of a bottom surface of the first support component.

An exhaust treatment unit according to a sixth aspect of the present invention relates to the exhaust treatment unit according to the fifth aspect, wherein the second support component has a bottom part and a convex part. The convex part is disposed in a position upwardly away from a flat surface forming the bottom part. The insertion hole is bored through the convex part.

An exhaust treatment unit according to a seventh aspect of the present invention relates to the exhaust treatment unit according to the sixth aspect, and wherein the convex part has a fixing portion for fixing the first support component.

An exhaust treatment unit according to an eighth aspect of the present invention relates to the exhaust treatment unit according to any of the first to fourth aspects, and wherein the diesel particulate filter device includes an attachment portion for a hoisting hook.

In the exhaust treatment unit according to the first aspect of the present invention, the first support component supporting the diesel particulate filter device is attachable/detachable to/from the second support component. Therefore, the diesel particulate filter device is disposed within the exhaust treatment unit such that it can be easily detached from the vehicle.

In the exhaust treatment unit according to the second aspect of the present invention, the diesel particulate filter device is supported while being disposed upwards of the selective catalytic reduction device. In other words, the diesel particulate filter device is disposed in a more easily detachable position within the exhaust treatment unit. Therefore, the diesel particulate filter device is disposed within the exhaust treatment unit such that it can be easily detached from the vehicle.

In the exhaust treatment unit according to the third aspect of the present invention, the second support component has the insertion hole through which the connection port of the diesel particulate filter device is inserted. Accordingly, it is possible to perform a work of connecting the connection port and the connection pipe (hereinafter referred to as a first connection pipe) for connecting the engine and the diesel particulate filter device on the back side of the second support component (on the side opposite to where the diesel particulate filter device and the selective catalytic reduction device are disposed). Thus, it is not required to greatly move the first connection pipe in performing the connection work. Therefore, the diesel particulate filter device can be easily attached/detached to/from the vehicle.

In the exhaust treatment unit according to the fourth aspect of the present invention, the connection port is downwardly directed from the diesel particulate filter device. Therefore, when the diesel particulate filter device is upwardly lifted and detached from the vehicle, the first connection pipe less easily interferes with the diesel particulate filter device. Accordingly, the diesel particulate filter device can be easily detached from the vehicle.

In the exhaust treatment unit according to the fifth aspect of the present invention, the connection port is disposed upwards of the bottom surface of the first support component. Therefore, the connection port does not contact the ground even when the first support component is put on the ground while the diesel particulate filter device is mounted thereon. Therefore, the attachment/detachment work for the diesel particulate filter device can be efficiently performed.

In the exhaust treatment unit according to the sixth aspect of the present invention, the convex part, through which the insertion hole is bored, is disposed in a position upwardly away from the flat surface forming the bottom part of the second support component. Accordingly, the first support component can be disposed on the second support component while the connection port is inserted through the insertion hole.

In the exhaust treatment unit according to the seventh aspect of the present invention, the fixing portion for fixing the first support component is disposed on the convex part. Therefore, even when the exhaust treatment unit is put on the ground while the first support component is supported, fixing components (e.g., bolts) for fixing the first support component do not directly contact the ground. Thus, the exhaust treatment unit can be stably put on the ground while the first support component is supported. Accordingly, safety of the attachment/detachment work for the exhaust treatment unit is enhanced.

In the exhaust treatment unit according to the eighth aspect of the present invention, the diesel particulate filter device includes the attachment portion for the hoisting hook. Accordingly, it is possible to easily perform a work of attaching the diesel particulate filter device to the first support component and a work of detaching the diesel particulate filter device from the first support component.

DETAILED DESCRIPTION OF EMBODIMENT(S)

Figure 1:
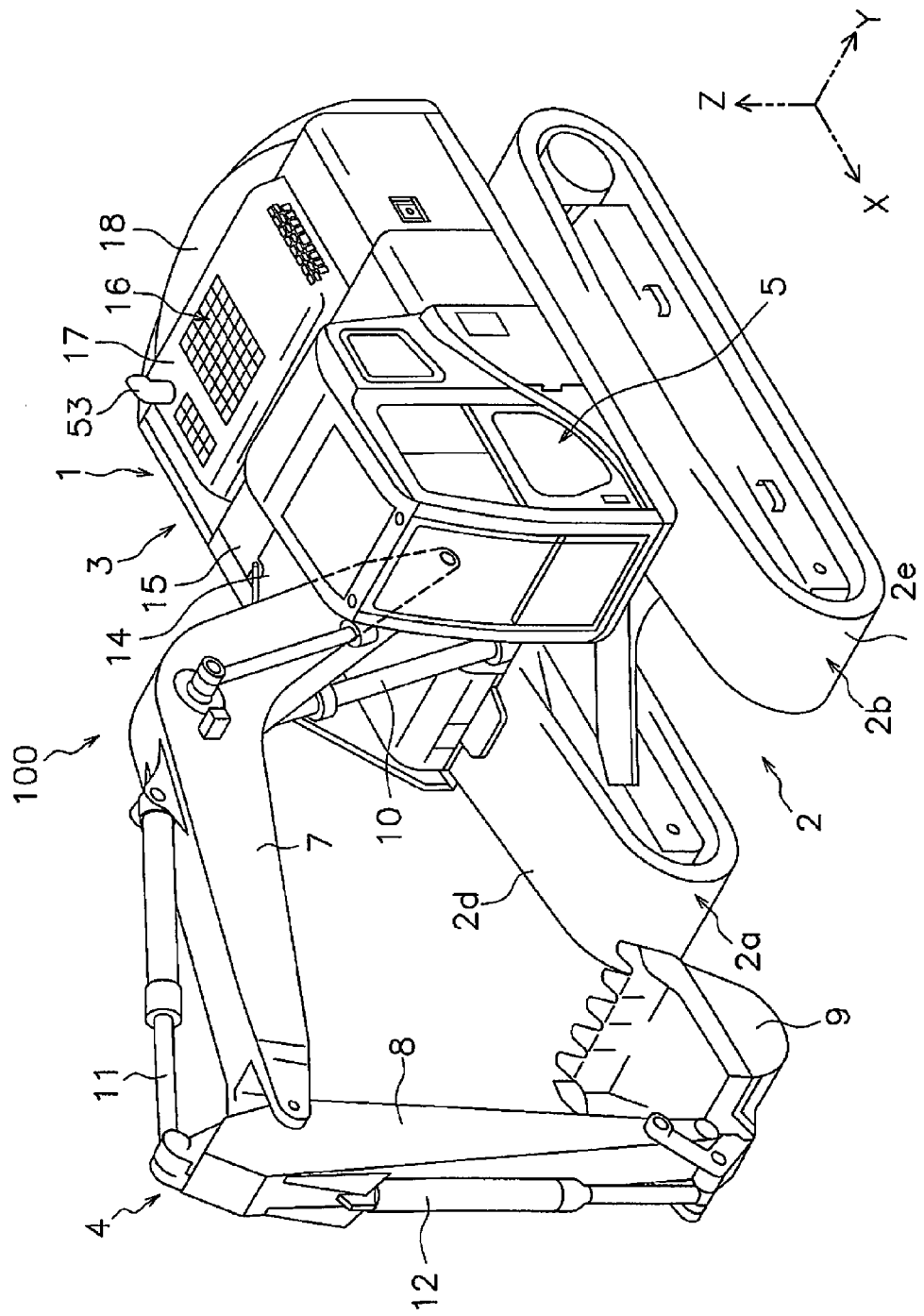
FIG. 1 is a perspective view of a work vehicle according to an exemplary embodiment of the present invention.

FIG. 1 illustrates a work vehicle 100 according to an exemplary embodiment of the present invention. In the present exemplary embodiment, explanation will be made by exemplifying a hydraulic excavator as the work vehicle. The work vehicle 100 includes a vehicle main body 1 and a working implement 4.

The vehicle main body 1 includes a travelling unit 2 and a revolving unit 3. The travelling unit 2 includes a pair of drive units 2a and 2b. The drive units 2a and 2b respectively include crawler belts 2d and 2e. The drive units 2a and 2b are configured to drive the crawler belts 2d and 2e by means of driving force from an engine 21 to be described (see FIG. 2) for causing the work vehicle 100 to run. It should be noted that in the following explanation, the term "back-and-forth direction" refers to the back-and-forth direction of the vehicle main body 1. In other words, the term "back-and-forth direction" refers to the back-and-forth direction seen from an operator seated in a cab 5. Further, the term "right-and-left direction" or "lateral direction" refers to the vehicle width direction of the vehicle main body 1. In other words, the right-and-left direction, the vehicle width direction or the lateral direction is the right-and-left direction seen from the aforementioned operator. Further, in the drawings, the back-and-forth direction, the right-and-left direction and an up-and-down direction are represented with an x-axis, a y-axis and a z-axis, respectively.

The revolving unit 3 is mounted on the travelling unit 2. The revolving unit 3 is configured to be able to revolve with respect to the travelling unit 2. Further, the revolving unit 3 is provided with the cab 5. The revolving unit 3 includes a fuel tank 14, a hydraulic oil tank 15, an engine compartment 16 and a counterweight 18. The fuel tank 14 stores fuel for driving the engine 21 to be described hereinafter. The fuel tank 14 is disposed in front of the hydraulic oil tank 15. The hydraulic oil tank 15 stores hydraulic oil to be discharged from a hydraulic pump 23 to be described hereinafter (see FIG. 2). The hydraulic oil tank 15 is disposed in alignment with the fuel tank 14 in the back-and-forth direction.

The engine compartment 16 accommodates a variety of devices including the engine 21 and the hydraulic pump 23 as described below. The engine compartment 16 is disposed behind the cab 5, the fuel tank 14 and the hydraulic oil tank 15. The top side of the engine compartment 16 is covered with an engine hood 17. The counterweight 18 is disposed behind the engine compartment 16.

The working implement 4 is attached to the center position on the front part of the revolving unit 3. The working implement 4 includes a boom 7, an arm 8, a bucket 9, a boom cylinder 10, an arm cylinder 11 and a bucket cylinder 12. The base end of the boom 7 is rotatably coupled to the revolving unit 3. On the other hand, the tip end of the boom 7 is rotatably coupled to the base end of the arm 8. The tip end of the aim 8 is rotatably coupled to the bucket 9. The boom cylinder 10, the arm cylinder 11 and the bucket cylinder 12 are hydraulic cylinders configured to be driven by the hydraulic oil discharged from the hydraulic pump 23 to be described hereinafter. The boom cylinder 10 is configured to actuate the boom 7. The arm cylinder 11 is configured to actuate the arm 8. The bucket cylinder 12 is configured to actuate the bucket 9. The working implement 4 is configured to be driven by the driving of the cylinders 10, 11 and 12.

Figure 2:
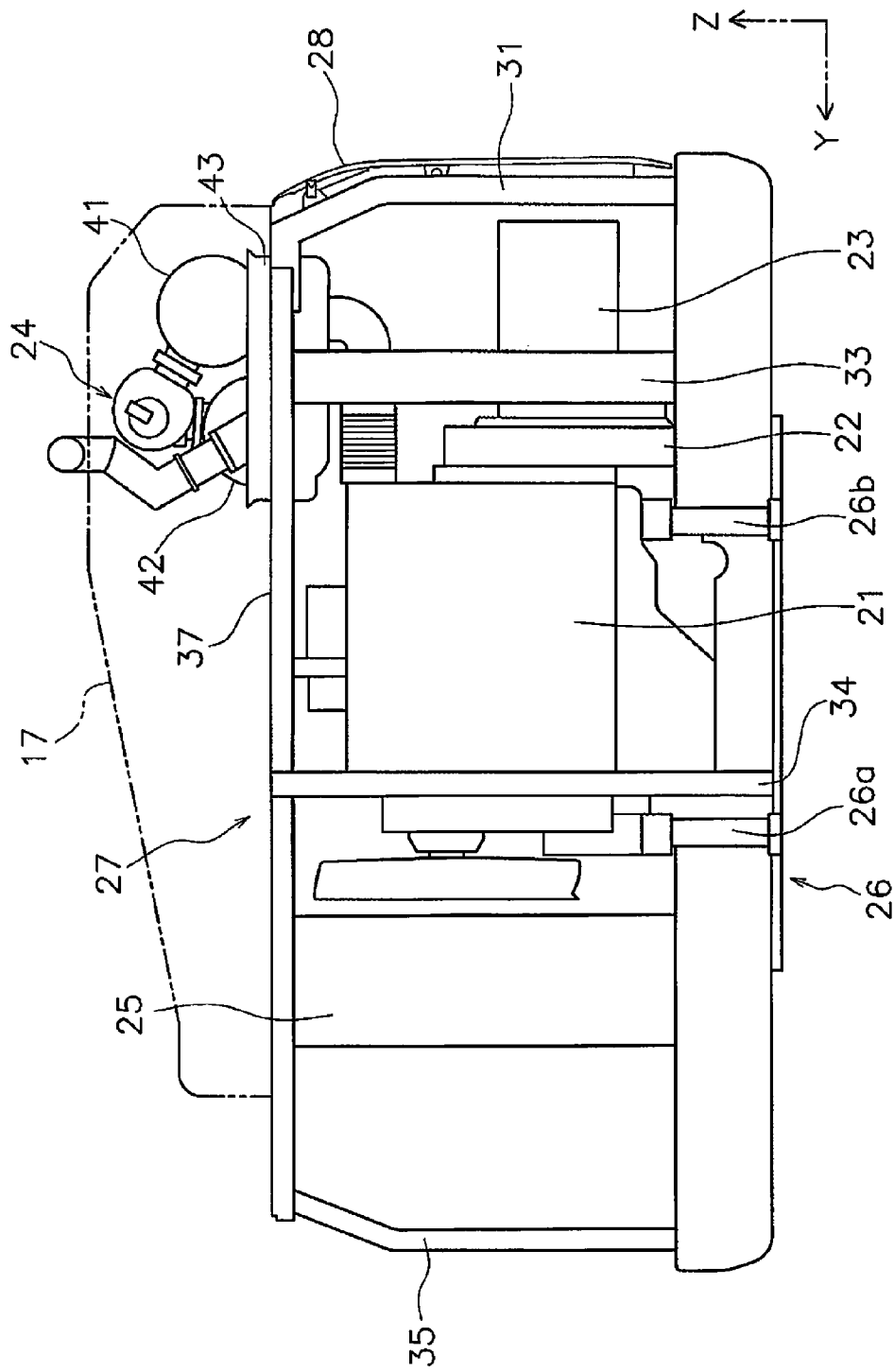
FIG. 2 is a diagram of an internal structure of an engine compartment seen from rear.
Figure 3:
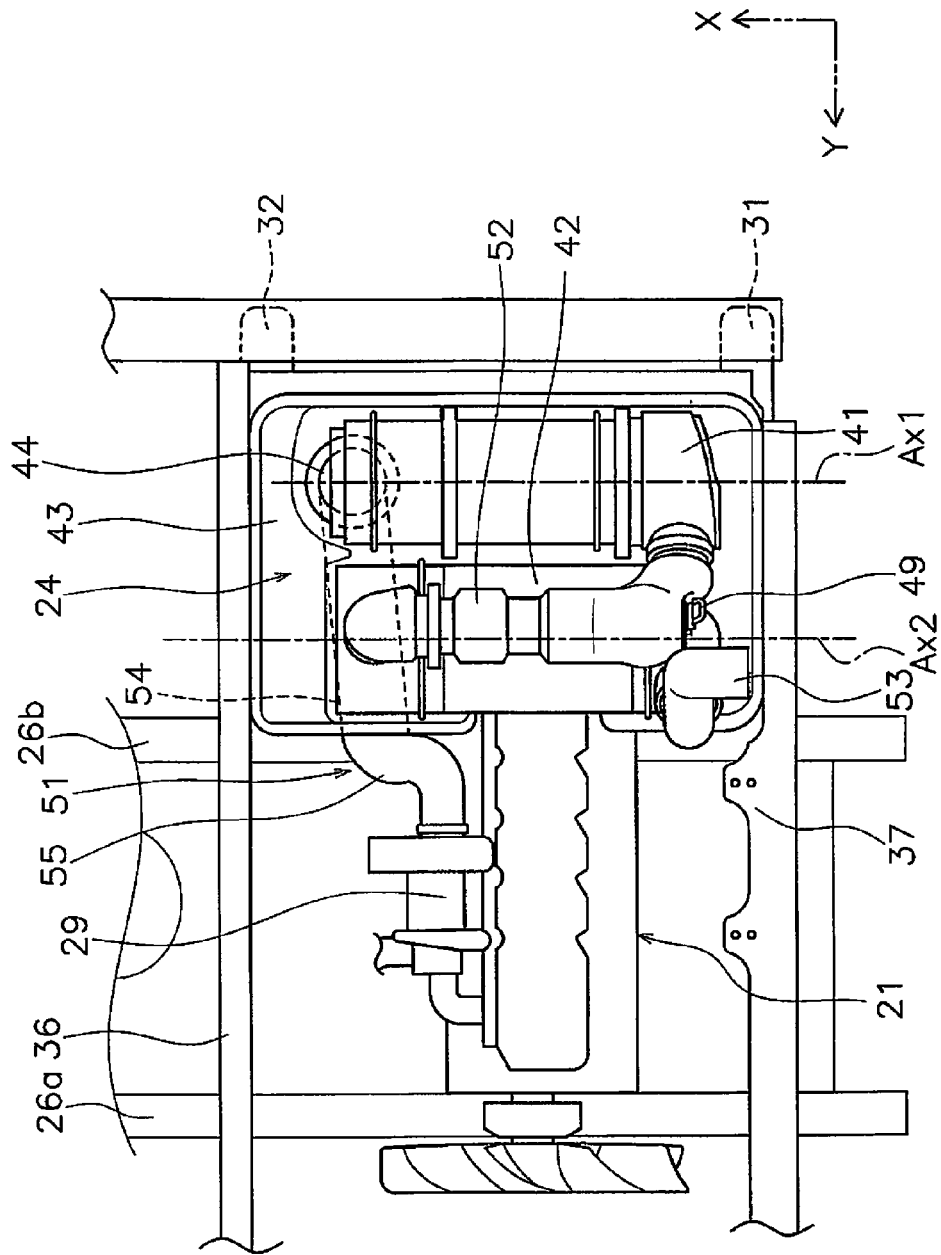
FIG. 3 is a diagram of the internal structure of the engine compartment seen from above.

FIG. 2 is a diagram of the internal structure of the engine compartment 16 seen from rear. FIG. 3 is a diagram of the internal structure of the engine compartment 16 seen from above. As illustrated in FIG. 2, the engine 21, a flywheel housing 22, the hydraulic pump 23 and an exhaust treatment unit 24 are disposed in the engine compartment 16. Further, a cooling device 25, including a radiator and an oil cooler, is disposed in the engine compartment 16. The cooling device 25, the engine 21, the flywheel housing 22 and the hydraulic pump 23 are disposed in alignment with each other in the vehicle width direction.

As illustrated in FIG. 2, the work vehicle 100 includes a revolving frame 26 and a vehicle body frame 27. The revolving frame 26 includes a pair of center frames 26a and 26b extending in the back-and-forth direction. The revolving frame 26 supports the engine 21 through rubber dampers.

The vehicle body frame 27 is disposed upright on the revolving frame 26. The vehicle body frame 27 is disposed in the surrounding of a variety of devices such as the engine 21 and the hydraulic pump 23. An exterior cover 28 is attached to the vehicle body frame 27. It should be noted that FIG. 2 illustrates only a part of the exterior cover 28. The engine hood 17 illustrated in FIG. 1 is also attached to the vehicle body frame 27.

As illustrated in FIGS. 2 and 3, the vehicle body frame 27 includes a plurality of column members 31 to 35 and a plurality of beam members 36 and 37. The column members 31 to 35 are disposed to extend upwardly from the revolving frame 26. The beam members 36 and 37 are supported by the column members 31 to 35. Specifically, as illustrated in FIG. 3, the plural beam members 36 and 37 include the first beam member 36 and the second beam member 37. The first beam member 36 and the second beam member 37 are disposed away from each other in the back-and-forth direction. The first beam member 36 is disposed in front of the engine 21. The second beam member 37 is disposed behind the engine 21.

The hydraulic pump 23 is configured to be driven by the engine 21. As illustrated in FIG. 2, the hydraulic pump 23 is disposed laterally to the engine 21. In other words, the hydraulic pump 23 is disposed in alignment with the engine 21 in the vehicle width direction. The hydraulic pump 23 is disposed at a position lower than the top surface of the engine 21.

The flywheel housing 22 is disposed between the engine 21 and the hydraulic pump 23. The flywheel housing 22 is attached to a lateral surface of the engine 21. On the other hand, the hydraulic pump 23 is attached to a lateral surface of the flywheel housing 22.

Figure 4:
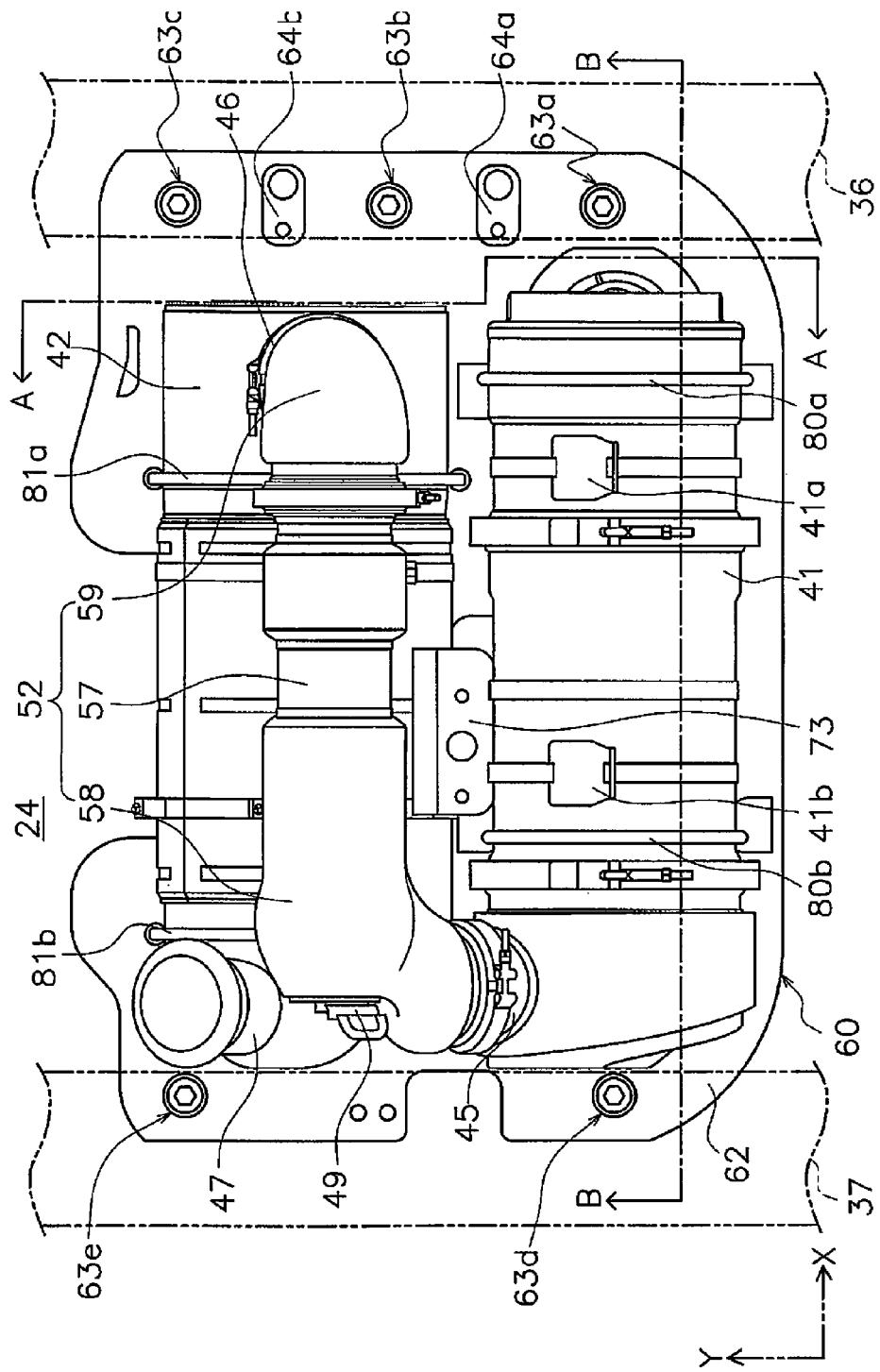
FIG. 4 is a plan view of an exhaust treatment unit.

As illustrated in FIG. 2, the exhaust treatment unit 24 is disposed above the hydraulic pump 23. FIG. 4 is an enlarged view of a part related to the exhaust treatment unit 24 in FIG. 3. In other words, FIG. 4 is a plan view of the exhaust treatment unit 24. In FIG. 4, some components, which are connected to but not included in the exhaust treatment unit 24, are depicted with two-dot chain lines. As illustrated in FIGS. 3 and 4, the exhaust treatment unit 24 includes a first exhaust treatment device 41, a second exhaust treatment device 42, a bracket 43 and a second connection pipe 52. As illustrated in FIGS. 3 and 4, the exhaust treatment unit 24 is bridged between the first beam member 36 and the second beam member 37. The exhaust treatment unit 24 is supported by the beam members 36 and 37. In other words, the first exhaust treatment device 41 and the second exhaust treatment device 42 are supported by the vehicle body frame 27. As illustrated in FIGS. 2 to 4, the first exhaust treatment device 41 and the second exhaust treatment device 42 are disposed in alignment with each other in the vehicle width direction.

In the present exemplary embodiment, the first exhaust treatment device 41 is a diesel particulate filter device, for instance, and is configured to treat the exhaust gas from the engine 21. The first exhaust treatment device 41 is configured to collect particulates contained in the exhaust gas by a filter. The first exhaust treatment device 41 is configured to burn the collected particulates by a heater attached to the filter.

The first exhaust treatment device 41 has a roughly cylindrical contour. As illustrated in FIG. 3, the first exhaust treatment device 41 is disposed such that its center axis Ax1 is arranged along the back-and-forth direction. Therefore, the first exhaust treatment device 41 is disposed such that its center axis Ax1 is arranged perpendicularly to a direction in which the engine 21 and the hydraulic pump 23 are aligned with each other (the direction will be hereinafter referred to as a first direction). In other words, the first exhaust treatment device 41 is disposed such that its longitudinal direction is arranged perpendicularly to the first direction. Further, as illustrated in FIG. 4, the first exhaust treatment device 41 includes first attachment portions 41a and 41b. The first attachment portions 41a and 41b are components for attaching thereto hoisting hooks of a crane or the like for hoisting the first exhaust treatment device 41. The first attachment portions 41a and 41b will be described below in detail.

In the present exemplary embodiment, the second exhaust treatment device 42 is a selective catalytic reduction device, for instance, and is configured to treat the exhaust gas from the engine 21. The second exhaust treatment device 42 is configured to selectively reduce nitrogen oxide $NO_x$ by urea hydrolysis. The second exhaust treatment device 42 has a roughly cylindrical contour. The second exhaust treatment device 42 is disposed such that its center axis Ax2 is arranged along the back-and-forth direction. Therefore, the second exhaust treatment device 42 is disposed such that its center axis Ax2 is arranged perpendicularly to the first direction. In other words, the second exhaust treatment device 42 is disposed such that its longitudinal direction is arranged perpendicularly to the first direction. Further, the second exhaust treatment device 42 is disposed such that its center axis Ax2 is arranged in parallel to the center axis Ax1 of the first exhaust treatment device 41.

Figure 5:
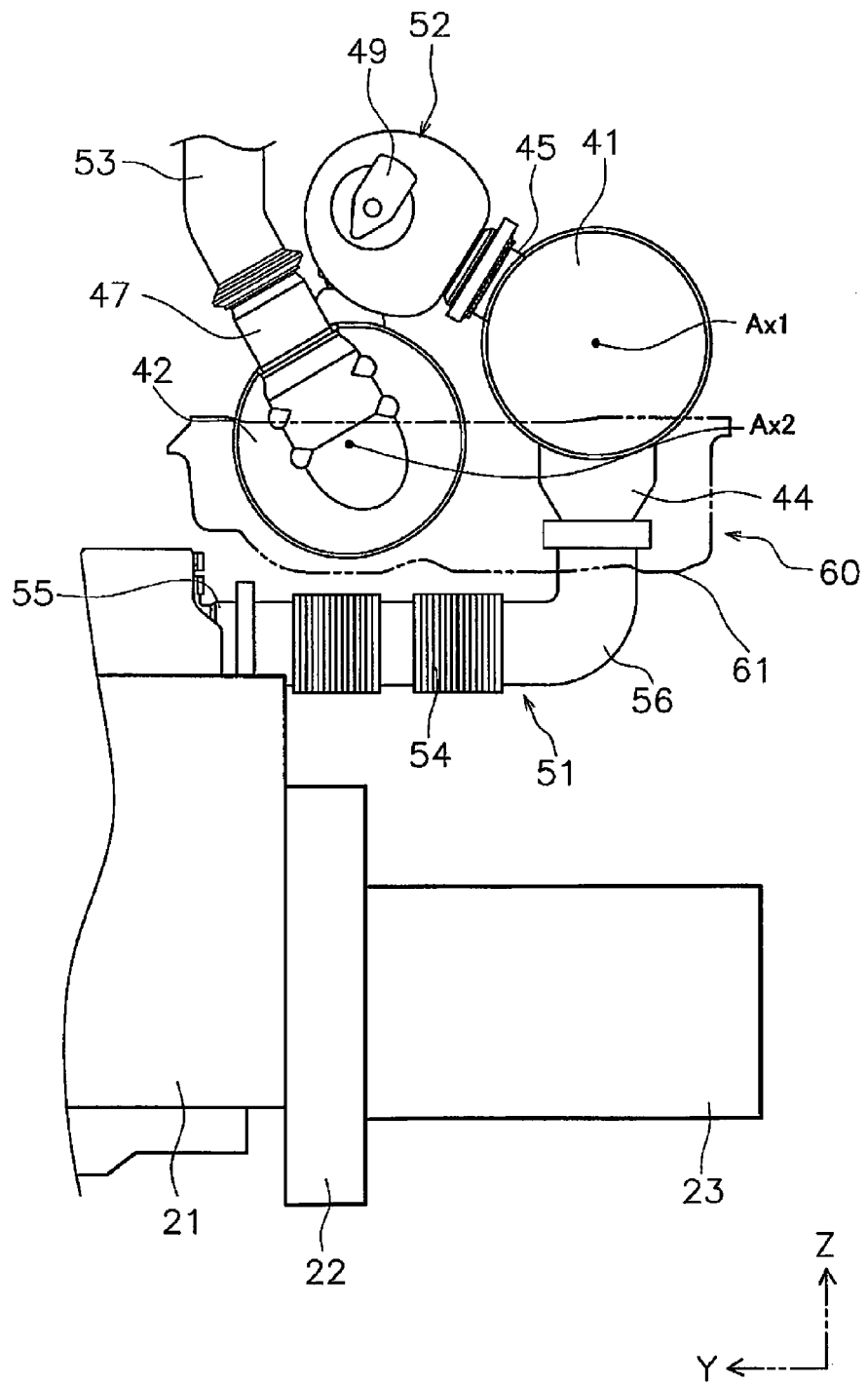
FIG. 5 is an enlarged view of the exhaust treatment unit and its vicinity of FIG. 2.
Figure 6:
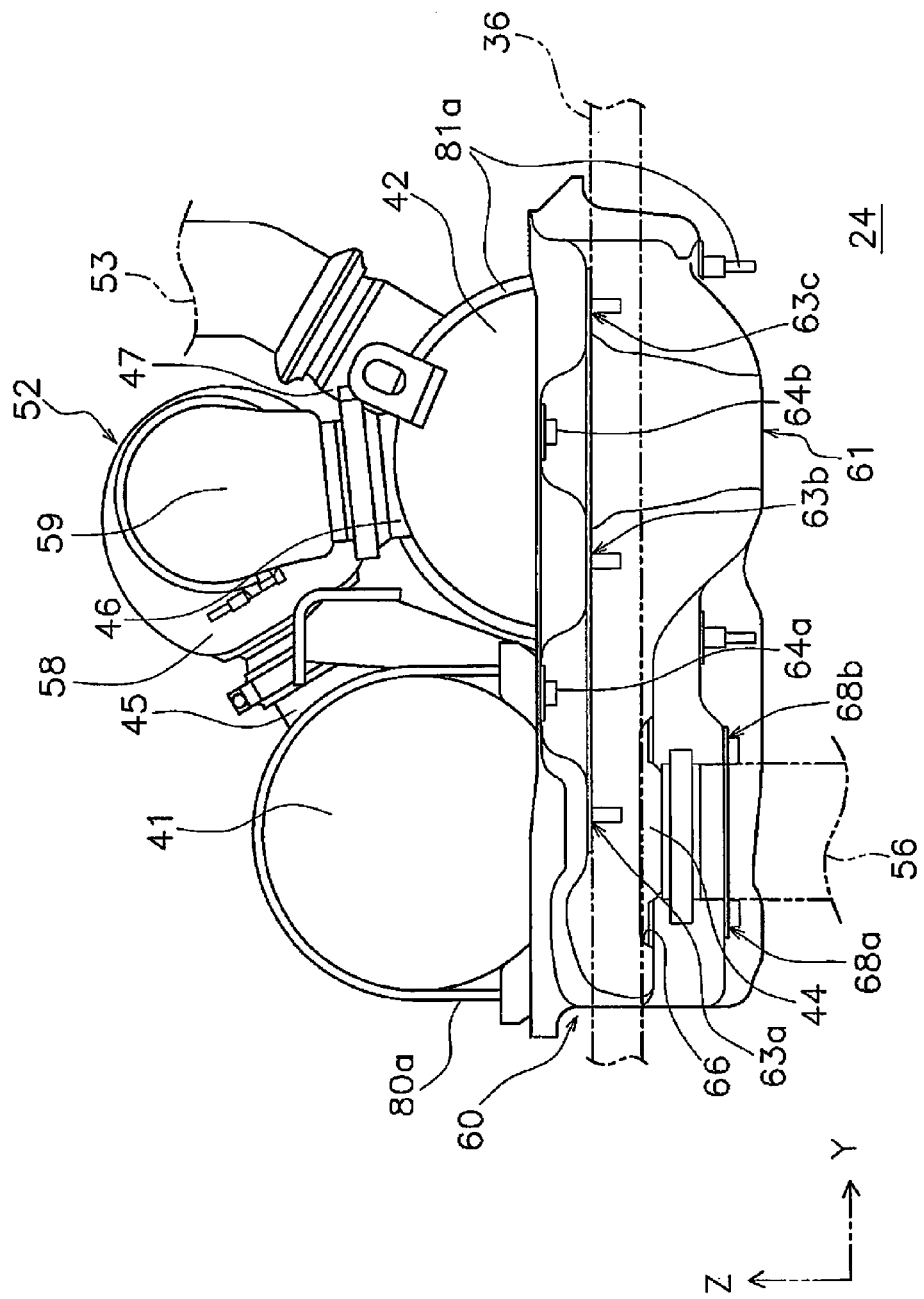
FIG. 6 is a diagram of the exhaust treatment unit seen from front.
Figure 7:
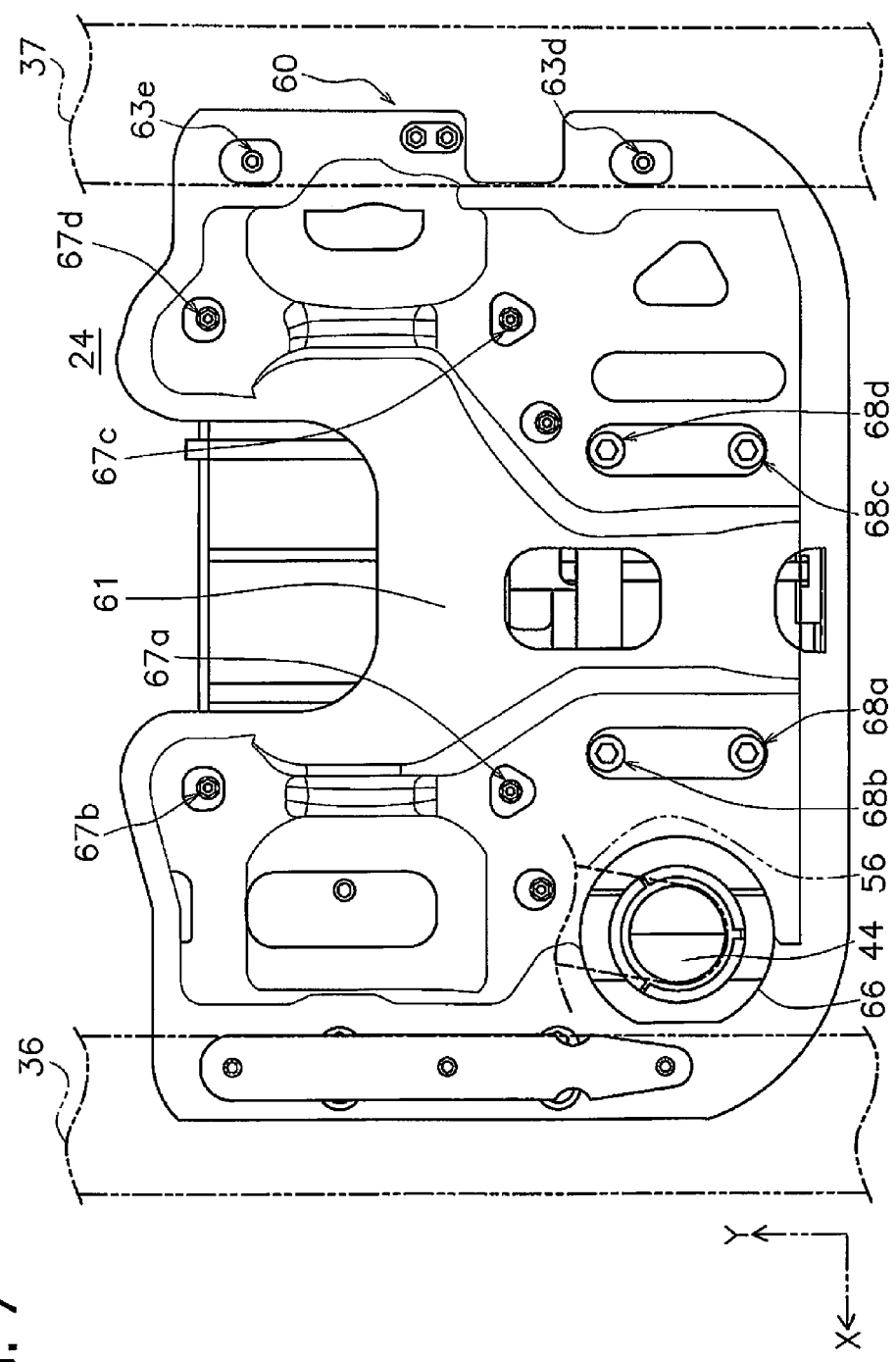
FIG. 7 is a bottom view of the exhaust treatment unit.

FIG. 5 is an enlarged view of the exhaust treatment unit 24 and its vicinity in FIG. 2. It should be noted that in FIG. 5, for easy understanding, the contour of a second support component 60 to be described hereinafter is depicted with a two-dot chain line without illustration of some components such as the vehicle body frame 27. FIG. 6 is a diagram of the exhaust treatment unit 24 in FIG. 5 seen from front. FIG. 7 is a bottom view of the exhaust treatment unit 24. In FIGS. 6 and 7, some components, which are connected to but not included in the exhaust treatment unit 24, are displayed with two-dot chain lines.

As illustrated in FIG. 5, the first exhaust treatment device 41 and the second exhaust treatment device 42 are disposed above the hydraulic pump 23. The bottom part of the second exhaust treatment device 42 is positioned below the top surface of the engine 21. As illustrated in FIGS. 5 to 7, the first exhaust treatment device 41 includes a first connection port 44.

As illustrated in FIG. 5, the work vehicle 100 includes a first connection pipe 51. The first connection pipe 51 couples the engine 21 and the first exhaust treatment device 41.

The first connection pipe 51 includes a bellows part 54 that can be extended and contracted. For example, the bellows part 54 is formed by coupling a plurality of bellows-type expansion and contraction joints. The bellows part 54 is horizontally disposed. Specifically, the bellows part 54 extends in the vehicle width direction. The bellows part 54 is disposed above the hydraulic pump 23. The bellows part 54 is partially positioned under the second exhaust treatment device 42. In other words, the first connection pipe 51 passes under the second exhaust treatment device 42.

The first connection pipe 51 includes a first curved portion 55 and a second curved portion 56. As illustrated in FIG. 3, the first curved portion 55 couples the bellows part 54 and the engine 21. In other words, one end of the first connection pipe 51 is connected to an exhaust port of the engine 21 via a supercharger 29. As illustrated in FIGS. 5 to 7, the second curved portion 56 couples the bellows part 54 and the first connection port 44. In other words, the other end of the first connection pipe 51 is connected to the first connection port 44 of the first exhaust treatment device 41.

Figure 8:
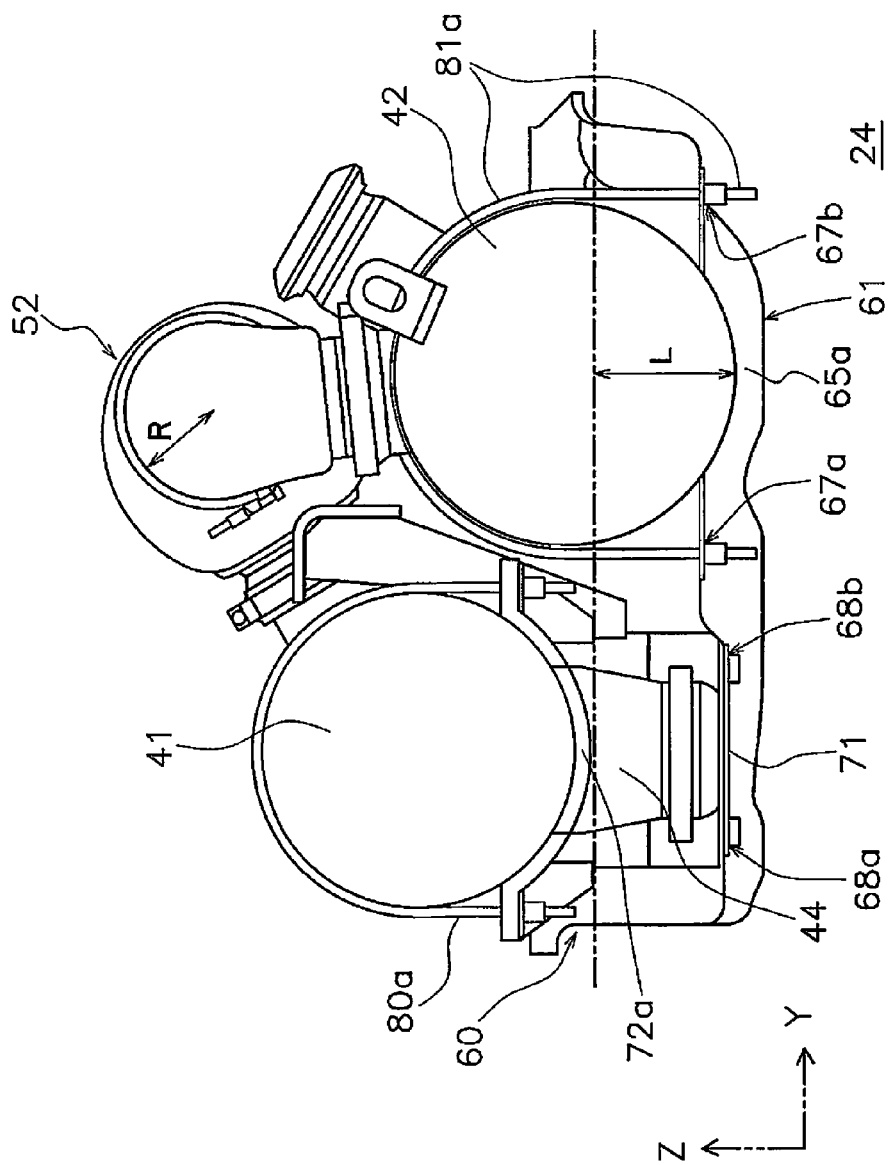
FIG. 8 is a cross-sectional view of the exhaust treatment unit seen in a direction of a cross-sectional line A-A in FIG. 4.
Figure 9:
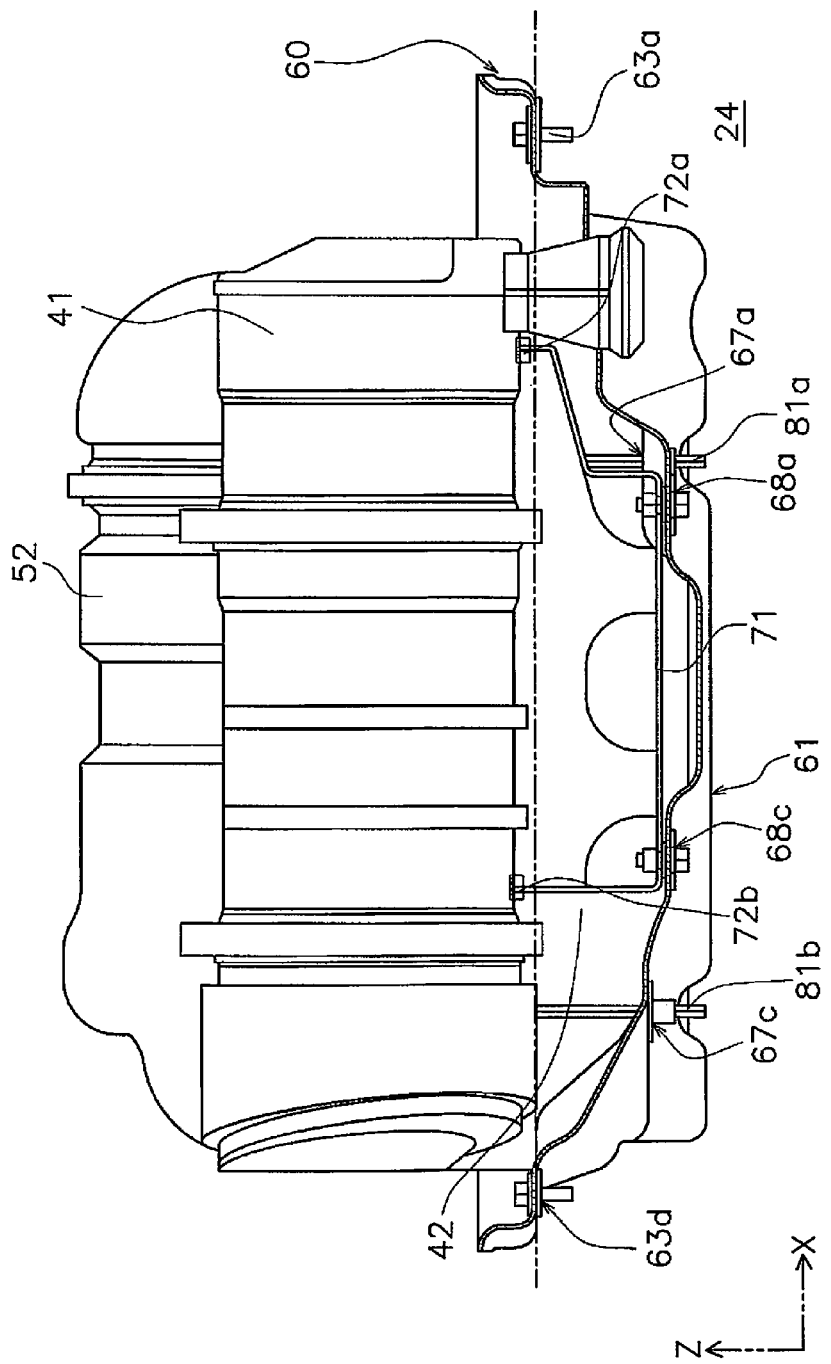
FIG. 9 is a cross-sectional view of the exhaust treatment unit seen in a direction of a cross-sectional line B-B in FIG. 4.

FIGS. 8 and 9 are cross-sectional views of the exhaust treatment unit seen in the directions of cross-sectional lines A-A and B-B in FIG. 4, respectively. As illustrated in FIGS. 5 and 7-9, the first connection port 44 is set on the lowermost part of the first exhaust treatment device 41. Therefore, the connection part between the first connection pipe 51 and the first exhaust treatment device 41 is positioned right below the first exhaust treatment device 41.

As illustrated in FIGS. 4 and 6, the first exhaust treatment device 41 includes a second connection port 45. The second connection port 45 protrudes obliquely upwards and in the vehicle width direction. The second exhaust treatment device 42 includes a third connection port 46. The third connection port 46 is positioned on the uppermost part of the second exhaust treatment device 42.

The exhaust treatment unit 24 includes the second connection pipe 52. One end of the second connection pipe 52 is connected to the second connection port 45 of the first exhaust treatment device 41. The other end of the second connection pipe 52 is connected to the third connection port 46 of the second exhaust treatment device 42. In other words, the second connection pipe 52 is a relay connection pipe for connecting the first exhaust treatment device 41 and the second exhaust treatment device 42. The second connection pipe 52 is disposed adjacently to the second exhaust treatment device 42 while being disposed over the second exhaust treatment device 42.

As illustrated in FIG. 4, the second connection pipe 52 includes a straight portion 57, a third curved portion 58 and a fourth curved portion 59. The straight portion 57 is positioned over the second exhaust treatment device 42. The third curved portion 58 couples the straight portion 57 and the second connection port 45. The fourth curved portion 59 couples the straight portion 57 and the third connection port 46. An aqueous urea injection device 49 is attached to the third curved portion 58. The aqueous urea injection device 49 is configured to inject aqueous urea into the second connection pipe 52.

As illustrated in FIGS. 4 and 5, the second exhaust treatment device 42 includes a fourth connection port 47. The fourth connection port 47 protrudes obliquely upwards. Specifically, the fourth connection port 47 protrudes obliquely upwards and towards the engine 21. The aforementioned aqueous urea injection device 49 is positioned over the fourth connection port 47. However, the fourth connection port 47 is obliquely disposed to avoid interfering with the aqueous urea injection device 49. The work vehicle 100 is provided with an exhaust pipe 53. The exhaust pipe 53 is connected to the fourth connection port 47. The upper part of the exhaust pipe 53 protrudes upwardly from the engine hood 17.

The engine 21, the first connection pipe 51, the first exhaust treatment device 41, the second connection pipe 52, the second exhaust treatment device 42 and the exhaust pipe 53 are connected in series in this sequential order. Therefore, the exhaust gas from the engine 21 is transferred to the first exhaust treatment device 41 via the first connection pipe 51. In the first exhaust treatment device 41, particulates are mostly reduced from the exhaust gas. Next, the exhaust gas is transferred to the second exhaust treatment device 42 via the second connection pipe 52. In the second exhaust treatment device 42, $NO_x$ is mostly reduced. Subsequently, the cleaned exhaust gas is discharged to the outside via the exhaust pipe 53.

Figure 10:
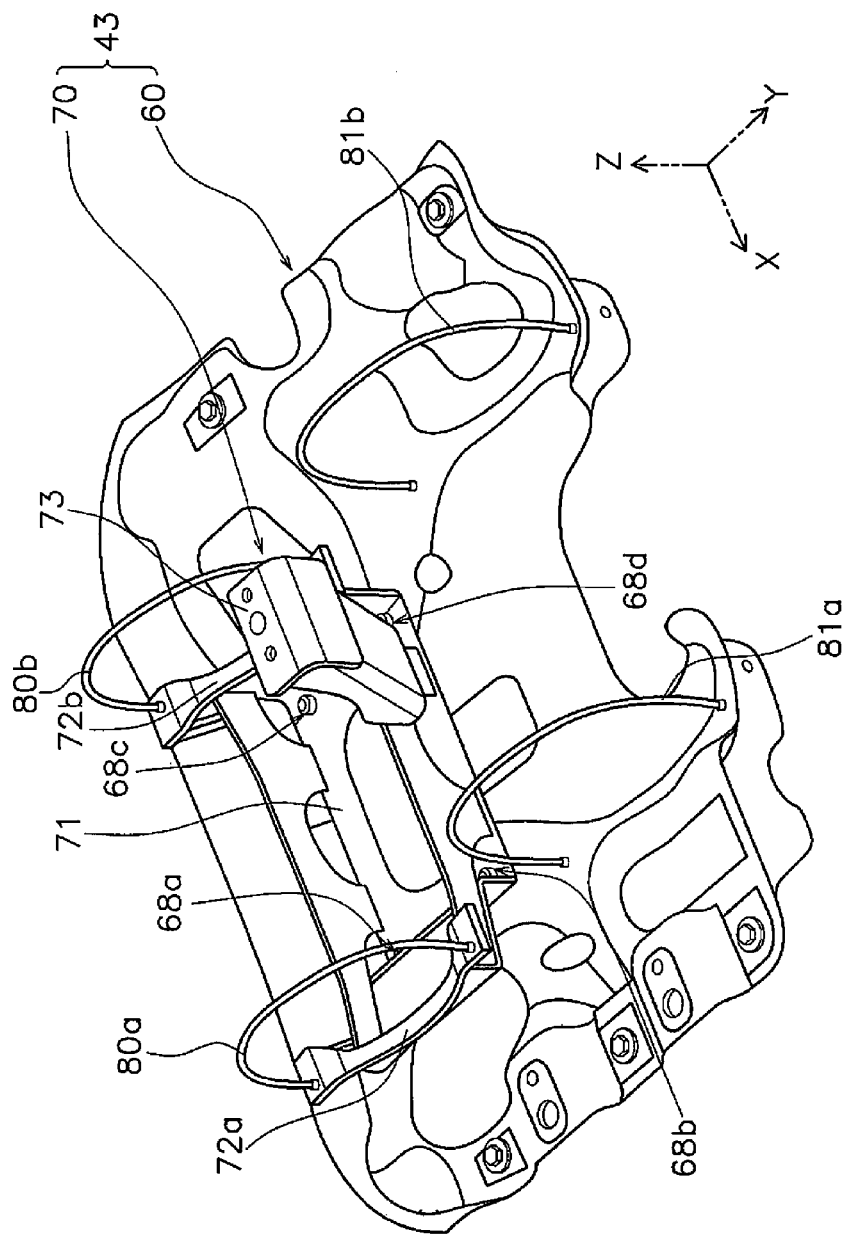
FIG. 10 is a perspective view of fixing components for the exhaust treatment device.

The first exhaust treatment device 41 and the second exhaust treatment device 42 are attached to the bracket 43. FIG. 10 is a perspective view of fixing components for fixing the first exhaust treatment device 41 and the second exhaust treatment device 42 in the first exemplary embodiment. As illustrated in FIG. 10, the fixing components include the bracket 43, first grabbing components 80a and 80b and second locking components 81a and 81b. The bracket 43 includes a first support component 70 and the second support component 60.

The second support component 60 is formed by means of stamping of a single member. The first support component 70 is a member provided separately from the second support component 60, and is attached to the second support component 60. The first locking components 80a and 80b are mounted around the first exhaust treatment device 41 supported by first support portions 72a and 72b (to be described below in detail) of the first support component 70. The first exhaust treatment device 41 is fixed on the first support component 70 by the first locking components 80a and 80b and the first support portions 72a and 72b. The second locking components 81a and 81b are mounted around the second exhaust treatment device 42 supported by second support portions 65a and 65b (to be described below in detail) of the second support component 60. The second exhaust treatment device 42 is fixed on the second support component 60 by the second locking components 81a and 81b and the second support portions 65a and 65b. Thus, the first exhaust treatment device 41, the second exhaust treatment device 42 and the bracket 43 are integrated.

Figure 11:
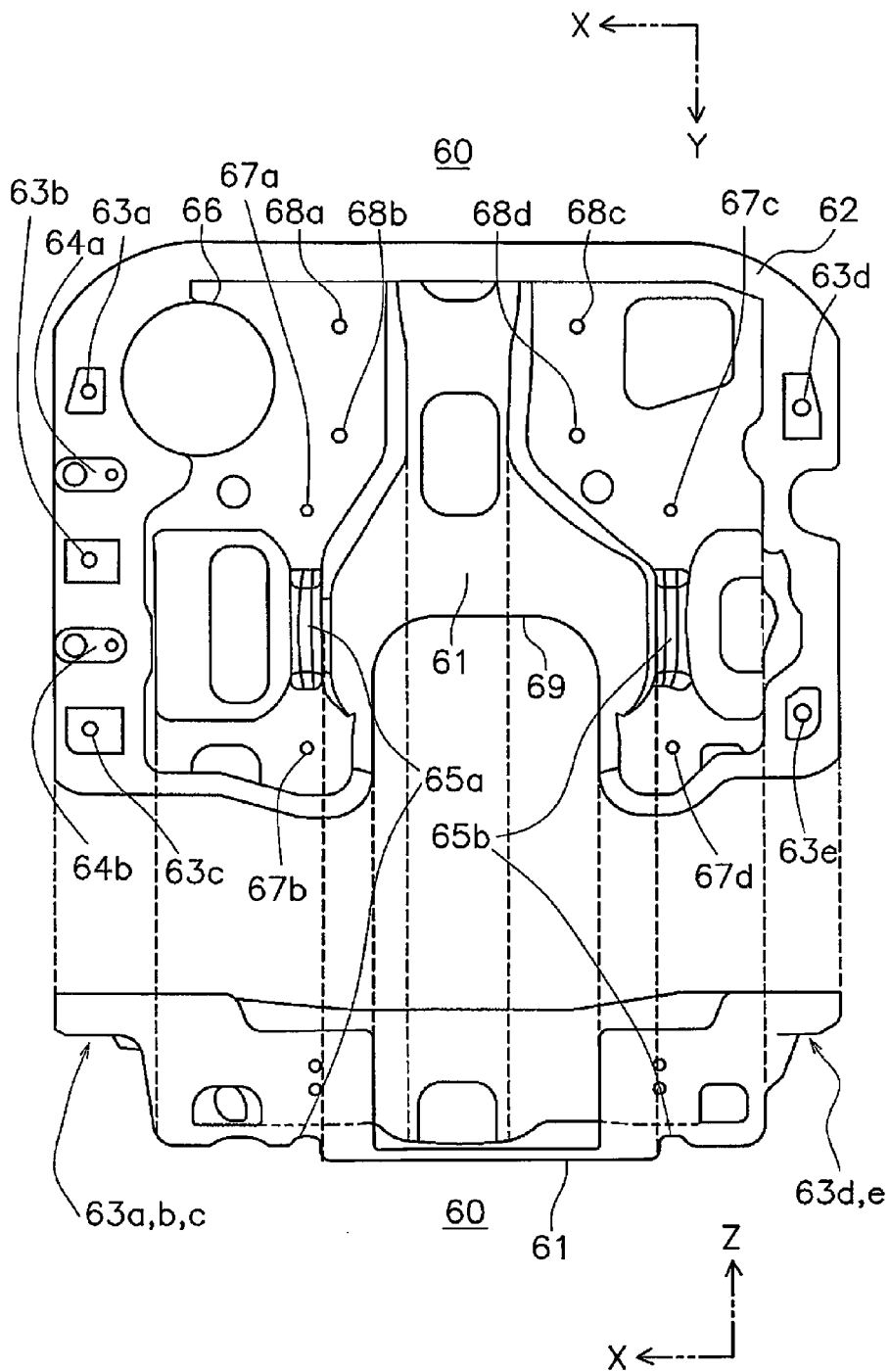
FIG. 11 includes a plan view and a front view of a second support component.

FIG. 11 illustrates a plan view and a front view of the second support component 60. In FIG. 11, corresponding positions are connected with dotted lines for representing positional correspondence between the plan view and the front view. The second support component 60 has a bottom part 61 and a convex part 62. The convex part 62 includes second attachment portions 63a, 63b, 63c, 63d and 63e, third attachment portions 64a and 64b, second support portions 65a and 65b, an insertion hole 66, fourth attachment portions 67a, 67b, 67c and 67d, and fixing portions 68a, 68b, 68c and 68d.

As illustrated in FIGS. 6 and 8-10 and the front view of FIG. 11, the second support component 60 has a downwardly hollow shape. The bottom part 61 is a hollowest part of the second support component 60. In other words, the bottom part 61 is a flat surface configured to contact the horizontal ground when the second support component 60 is put on the horizontal ground while the surface opposite to the surface on which the second exhaust treatment device 42 is mounted is faced down.

The convex part 62 is the rest of the second support component 60 excluding the bottom part 61. In other words, the convex part 62 is disposed in a position upwardly away from the flat surface forming the bottom part 61. As is obvious from FIGS. 6 and 8-10, the front view of FIG. 11 and so forth, the vertical distance between the second attachment portions 63a to 63e and the bottom part 61, the vertical distance between the third attachment portions 64a and 64b and the bottom part 61, the vertical distance between the second support portions 65a and 65b and the bottom part 61, the vertical distance between the insertion hole 66 and the bottom part 61, the vertical distance between the fourth attachment portions 67a to 67d and the bottom part 61, and the vertical distance between the fixing portions 68a to 68d and the bottom part 61 are not necessarily the same.

The second attachment portions 63a to 63e illustrated in FIG. 11 are attached to the vehicle body frame 27 of the work vehicle 100. In more detail, as illustrated in FIGS. 4 and 7, the second attachment portions 63a, 63b and 63c are attached to the first beam member 36, whereas the second attachment portions 63d and 63e are attached to the second beam member 37. The second attachment portions 63a to 63e are positioned on the same plane. As illustrated in FIGS. 4, 6 and 7, in the present exemplary embodiment, the second support component 60 is attached to the beam members 36 and 37 with use of bolts and so forth. Accordingly, the second attachment portions 63a to 63e include holes. However, when another fixing means such as a latch is employed, the second attachment portions 63a to 63e may be formed in another shape or may include such members as hooks.

The bracket 43 is fixed to the vehicle body frame 27 by the second attachment portions 63a to 63e. In other words, the exhaust treatment unit 24 is fixed to the vehicle body frame 27. The second attachment portions 63a to 63e are detachably attached to the beam members 36 and 37. In other words, the exhaust treatment unit 24 is detachably attached to the vehicle body frame 27.

The third attachment portions 64a and 64b are used together with a fifth attachment portion 73 to be described hereinafter in order to attach/detach the exhaust treatment unit 24 to/from the vehicle. Specifically, the attachment/detachment work for the exhaust treatment unit 24 is performed by hoisting the exhaust treatment unit 24 with use of hooks as hoisting tools attached to the third attachment portions 64a and 64b and the fifth attachment portion 73. Further, while the hooks as hoisting tools are not attached to the third attachment portions 64a and 64b and/or the fifth attachment portion 73, another member may be attached to the work vehicle 100. For instance, an example of such member is a cover for covering at least a part of the exhaust treatment unit. As illustrated in FIG. 6, the third attachment portions 64a and 64b are positioned above the second attachment portions 63a, 63b and 63c for facilitating attachment/detachment of the hooks of hoisting tools.

The second support portions 65a and 65b illustrated in FIG. 11 support the second exhaust treatment device 42. Thus, the second support component 60 supports the second exhaust treatment device 42. The second exhaust treatment device 42 has a roughly cylindrical contour, while the second support portions 65a and 65b include contact surfaces fitted to the outer peripheral surface of the second exhaust treatment device 42. More specifically, the second support portions 65a and 65b include contact surfaces formed in a downwardly hollow shape.

The fourth attachment portions 67a to 67d illustrated in FIG. 11 include holes through which the second locking components 81a and 81b (see FIG. 10) for locking the second exhaust treatment device 42 are inserted. Each of the second locking components 81a and 81b includes screw grooves on the both ends thereof. As illustrated in FIGS. 6 to 8, the second locking components 81a and 81b are fixed, by means of nuts, to the fourth attachment portions 67a to 67d on the bottom surface of the second support component 60, i.e., on the opposite side of where the second exhaust treatment device 42 is supported. As illustrated in FIGS. 8 and 9, the fourth attachment portions 67a to 67d are positioned above the bottom part 61. Therefore, even when the second locking components 81a and 81b are inserted through the fourth attachment portions 67a to 67d, the tips of the second locking components 81a and 81b are not positioned below the bottom part 61. It should be noted that means for fixing the second locking components 81a and 81b to the second support component 60 are not limited to the aforementioned ones. The shapes and the positions of the fourth attachment portions 67a to 67d can be variously set in accordance with the fixing means.

The fixing portions 68a to 68d illustrated in FIG. 11 include holes through which bolts for fixing the first support component 70 to the second support component 60 are inserted. As illustrated in FIGS. 6 to 10, the first support component 70 and the second support component 60 are fixed to each other with use of bolts and nuts. In other words, the first support component 70 is detachably attached to the second support component 60. Therefore, only the first exhaust treatment device 41 can be detached from the vehicle by detaching the first support component 70 from the second support component 60. In this case, the first connection pipe 51 is detached from the first connection port 44. The second connection pipe 52 is detached from the second connection port 45. Then, the first support component 70 supporting the first exhaust treatment device 41 is detached from the second support component 60. At this time, hoisting hooks are attached to the first attachment portions 41a and 41b of the first exhaust treatment device 41. Further, the crane winds up a wire and so forth to which the hoisting hooks are attached, and thereby, the first exhaust treatment device 41 integrated with the first support component 70 is upwardly moved. Subsequently, the crane is moved in a revolving motion and so forth, and thereby, the first exhaust treatment device 41 integrated with the first support component 70 is moved to a predetermined position.

As illustrated in FIGS. 6, 8 and 9, the fixing portions 68a to 68d are positioned above the bottom part 61. Accordingly, the bolts or the nuts, fixing the first support component 70 and the second support component 60 to each other, are not positioned below the bottom part 61. It should be noted that means for fixing the first support component 70 to the second support component 60 are not limited to the aforementioned ones. The shapes and the positions of the fixing portions 68a to 68d can be variously set in accordance with the fixing means.

As illustrated in FIG. 10, the first support component 70 includes a bottom portion 71, the first support portions 72a and 72b and the fifth attachment portion 73. The fifth attachment portion 73 is used for the same application as the third attachment portions 64a and 64b. As illustrated in FIGS. 8 and 9, the bottom portion 71 contacts a part of the convex part 62 (particularly, peripheral portions of the fixing portions 68a to 68d). The bottom portion 71 is perforated to form holes corresponding to the fixing portions 68a to 68d.

The first support portions 72a and 72b are positioned along the bottom portion 71. The first support portions 72a and 72b support the first exhaust treatment device 41. In other words, the first support component 70 supports the first exhaust treatment device 41. The first exhaust treatment device 41 has a roughly cylindrical contour, while the first support portions 72a and 72b include contact surfaces fitted to the outer peripheral surface of the first exhaust treatment device 41. More specifically, the first support portions 72a and 72b include contact surfaces formed in a downwardly hollow shape.

FIG. 8 depicts the height of the second attachment portions 63a, 63b and 63c with a two-dot chain line such that the height corresponds to the positions of these attachment portions in FIG. 6. FIG. 9 depicts the height of the second attachment portions 63a and 63d with a two-dot chain line such that the height corresponds to the positions of the attachment portions. According to FIGS. 8 and 9, the second support portions 65a and 65b are positioned below the second attachment portions 63a to 63e, whereas the first support portions 72a and 72b are positioned slightly above the second attachment portions 63a to 63e. In other words, the support part is partially positioned below the second attachment portions 63a to 63e. Further, the second support portions 65a and 65b are positioned below the first support portions 72a and 72b. Therefore, the second exhaust treatment device 42 is supported by the second support component 60, while being positioned below the first exhaust treatment device 41. Further, as illustrated in FIG. 6, the second attachment portions 63a to 63e are attached on the beam members 36 and 37. Therefore, as illustrated in FIG. 8, the lowermost part of the first exhaust treatment device 41 is disposed above the beam members 36 and 37. Further, the bottom part of the second exhaust treatment device 42 is positioned below the beam members 36 and 37.

Moreover, as illustrated in FIG. 8, a vertical distance L between the lowermost part of the second exhaust treatment device 42 and the second attachment portions 63a to 63e is greater than a length R that is half of the outer diameter of the second connection pipe 52. Further, the second connection pipe 52 is disposed over the second exhaust treatment device 42. Therefore, it is possible to sufficiently suppress the height of the exhaust treatment unit 24 protruded from the vehicle body frame 27.

Next, as illustrated in FIGS. 6 and 7, the first connection port 44 is inserted through the insertion hole 66 of the second support component 60. The first support portions 72a and 72b are positioned higher than the bottom portion 71. Therefore, as illustrated in FIGS. 6 and 8, the lowermost part of the first connection port 44 is positioned above the bottom part 61. Further, the lowermost part of the first connection port 44 is positioned above the bottom portion 71. Accordingly, the first connection port 44 does not contact the ground even when the exhaust treatment unit 24 is detached from the work vehicle 100 and is placed on the ground. Furthermore, the first connection port 44 does not contact the ground even when the first support component 70 supporting the first exhaust treatment device 41 is detached from the second support component 60 and is placed on the ground. Accordingly, the maintenance performance of the first exhaust treatment device 41 can be further enhanced.

The exhaust treatment unit 24 according to the present exemplary embodiment has the following features. The bracket 43 includes the first support component 70 and the second support component 60, and the first support component 70 is attachable/detachable to/from the second support component 60. Therefore, the first exhaust treatment device 41 is disposed within the exhaust treatment unit 24 such that it can be easily detached from the vehicle. Therefore, the maintenance performance of the first exhaust treatment device 41, i.e., the diesel particulate filter device can be enhanced.

The lowermost part of the first connection port 44 of the first exhaust treatment device 41 is positioned above the bottom portion 71 of the first support component 70. Therefore, the first connection port 44 does not contact the ground even when the first support component 70, supporting the first exhaust treatment device 41, is detached from the second support component 60 and is then placed on the ground. Therefore, the maintenance performance of the first exhaust treatment device 41, i.e., the diesel particulate filter device can be enhanced.

Modifications

The exemplary embodiment of the present invention has been explained above. However, the present invention is not limited to the aforementioned exemplary embodiment, and a variety of changes can be made without departing from the scope of the present invention.

In the aforementioned exemplary embodiment, explanation has been made for the example of applying the exhaust treatment unit 24 to the hydraulic excavator. However, the exhaust treatment unit 24 may be applied to another work vehicle such as a bulldozer.

The first exhaust treatment device 41 may be disposed below the beam members 36 and 37. It should be noted that the first exhaust treatment device 41 is preferably disposed above the second exhaust treatment device 42.

The shape of the first exhaust treatment device 41 and that of the second exhaust treatment device 42 may not be limited to cylindrical shapes or the like, and may be other shapes such as an elliptic cylindrical shape or a rectangular parallelepiped shape.

The first direction may not be limited to the vehicle width direction, and may be another direction. In other words, the first exhaust treatment device 41 and the second exhaust treatment device 42 may be disposed in alignment with each other in a direction different from the vehicle width direction. For example, the first direction may be the vehicle back-and-forth direction. In other words, the first exhaust treatment device 41 and the second exhaust treatment device 42 may be disposed in alignment with each other in the vehicle back-and-forth direction.

The first exhaust treatment device 41 may be supported by any of the column members 31 to 35. The second exhaust treatment device 42 may be supported by any of the column members 31 to 35. The vehicle body frame 27, supporting the first exhaust treatment device 41 and the second exhaust treatment device 42, may not be limited to a component supporting the exterior cover 28. For example, a dedicated vehicle body frame configured to support the first exhaust treatment device 41 and the second exhaust treatment device 42 may be provided.

The number of the first support portions 72a and 72b, that of the second support portions 65a and 65b, that of the first locking components 80a and 80b, and that of the second locking components 81a and 81b may not be respectively limited to two, and may be either one or three or more. In correspondence with the configuration, the number of the fourth attachment portions 67a to 67d may be changed. Similarly, the number and so forth of the second attachment portions 63a to 63e, those of the third attachment portions 64a and 64b and those of the fixing portions 68a to 68d may be arbitrarily changed.

According to the present invention, it is possible to provide an exhaust treatment unit whereby the maintenance performance of a diesel particulate filter device can be enhanced.

The invention claimed is:

1. An exhaust treatment unit adapted to treat exhaust gas from an engine of a work vehicle, the exhaust treatment unit comprising:
 a diesel particulate filter device configured to treat the exhaust gas;
 a selective catalytic reduction device configured to treat the exhaust gas;
 a first support component configured to support the diesel particulate filter device; and a second support component configured to support the selective catalytic reduction device and the first support component, the second support component being formed in a downwardly hollow shape, the second support component having a bottom part and a convex part, the convex part being disposed in a position upwardly away from a flat surface forming the bottom part, the convex part having a fixing portion configured to fix the first support component thereto, and the first support component being detachable from the second support component while the diesel particulate filter device is mounted on the first support component.

2. The exhaust treatment unit recited in claim 1, wherein the selective catalytic reduction device is supported by the second support component while being disposed lower than the diesel particulate filter device.

3. The exhaust treatment unit recited in claim 1, wherein the diesel particulate filter device has a connection port configured to be connected to a connection pipe connected to the engine, and the second support component has an insertion hole through which the connection port is inserted.

4. The exhaust treatment unit recited in claim 3, wherein the connection port is downwardly directed from the diesel particulate filter device.

5. The exhaust treatment unit recited in claim 3, wherein the connection port is disposed upwards of a bottom surface of the first support component.

6. The exhaust treatment unit recited in claim 5, wherein the insertion hole is bored through the convex part.

7. The exhaust treatment unit recited in claim 1, wherein the diesel particulate filter device includes an attachment portion usable with a hoisting hook.

8. The exhaust treatment unit recited in claim 2, wherein the diesel particulate filter device has a connection port configured to be connected to a connection pipe connected to the engine, and the second support component has an insertion hole through which the connection port is inserted.

9. The exhaust treatment unit recited in claim 2, wherein the diesel particulate filter device includes an attachment portion usable with a hoisting hook.

10. The exhaust treatment unit recited in claim 5, wherein the connection port is disposed upwards of a bottom surface of the second support component.

11. The exhaust treatment unit recited in claim 10, wherein the insertion hole is bored through the convex part.

12. The exhaust treatment unit recited in claim 4, wherein the connection port is disposed upwards of a bottom surface of the first support component.

13. The exhaust treatment unit recited in claim 12, wherein the connection port is disposed upwards of a bottom surface of the second support component.

14. The exhaust treatment unit recited in claim 13, wherein the insertion hole is bored through the convex part.

15. The exhaust treatment unit recited in claim 3, wherein the diesel particulate filter device includes an attachment portion usable with a hoisting hook.

16. The exhaust treatment unit recited in claim 4, wherein the diesel particulate filter device includes an attachment portion usable with a hoisting hook.

* * * * *